(12) United States Patent
Nory et al.

(10) Patent No.: US 9,450,727 B2
(45) Date of Patent: Sep. 20, 2016

(54) PHYSICAL LAYER ACKNOWLEDGEMENT SIGNALING RESOURCE ALLOCATION IN WIRELESS COMMUNICATION SYSTEMS

(75) Inventors: Ravikiran Nory, Palatine, IL (US);
Robert T Love, Barrington, IL (US);
Vijay Nangia, Algonquin, IL (US);
Xiangyang Zhuang, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 1692 days.

(21) Appl. No.: 12/364,992

(22) Filed: Feb. 3, 2009

(65) Prior Publication Data

US 2010/0195583 A1   Aug. 5, 2010

(51) Int. Cl.
| | |
|---|---|
| *H04L 5/00* | (2006.01) |
| *H04L 1/00* | (2006.01) |
| *H04L 1/06* | (2006.01) |
| *H04L 1/18* | (2006.01) |
| *H04W 88/12* | (2009.01) |

(52) U.S. Cl.
CPC ............ *H04L 5/0053* (2013.01); *H04L 1/1854* (2013.01); *H04L 5/0007* (2013.01); *H04L 5/0023* (2013.01); *H04L 5/0055* (2013.01); *H04L 1/0071* (2013.01); *H04L 1/06* (2013.01); *H04L 1/1812* (2013.01); *H04W 88/12* (2013.01)

(58) Field of Classification Search
USPC ....... 370/328–330, 336, 341, 343, 436, 437, 370/442, 458, 468, 478, 480, 498, 537, 229
See application file for complete search history.

(56) References Cited

U.S. PATENT DOCUMENTS

| | | | |
|---|---|---|---|
| 7,440,399 B2 | 10/2008 | Julian et al. | |
| 7,774,686 B2 | 8/2010 | Ahn et al. | |
| 7,804,800 B2 | 9/2010 | Li et al. | |
| 7,873,002 B2 | 1/2011 | Cai | |
| 8,165,035 B2 | 4/2012 | Che et al. | |

(Continued)

FOREIGN PATENT DOCUMENTS

| | | |
|---|---|---|
| EP | 1599403 A2 | 8/2005 |
| WO | 2004/073200 A1 | 8/2004 |

(Continued)

OTHER PUBLICATIONS

Patent Cooperation Treaty, "International Search Report and Written Opinion of the International Searching Authority" for International Application No. PCT/US2010/022485, May 18, 2010, 15 pages.

(Continued)

*Primary Examiner* — Jung-Jen Liu
(74) *Attorney, Agent, or Firm* — Faegre Baker Daniels LLP

(57) ABSTRACT

A downlink subframe on a single downlink carrier supports physical layer acknowledgment signaling for multiple physical uplink shared channel (PUSCH) transmissions. The physical layer acknowledgement signaling may take the form of physical hybrid ARQ indicator channel (PHICH) signaling. A base unit reserves resource elements groups (REGs) for default PHICH signaling of default PUSCH transmissions. The base unit reserves control channel elements (CCEs) for physical downlink control channel (PDCCH) signaling. A CCE contains multiple interleaved REGs. The base unit takes any unreserved CCEs and maps those CCEs for physical layer acknowledgement signaling of additional PUSCH transmissions.

17 Claims, 4 Drawing Sheets

(56) References Cited

U.S. PATENT DOCUMENTS

| | | | |
|---|---|---|---|
| 2005/0122898 A1 | 6/2005 | Jang et al. | |
| 2006/0133273 A1 | 6/2006 | Julian et al. | |
| 2007/0047502 A1 | 3/2007 | Marinier et al. | |
| 2007/0097981 A1 | 5/2007 | Papasakellariou | |
| 2007/0171849 A1 | 7/2007 | Zhang et al. | |
| 2008/0051125 A1 | 2/2008 | Muharemovic et al. | |
| 2008/0070582 A1 | 3/2008 | Cai | |
| 2008/0084853 A1 | 4/2008 | Kuchibhotla et al. | |
| 2008/0117878 A1* | 5/2008 | Kim et al. | 370/331 |
| 2008/0175195 A1* | 7/2008 | Cho et al. | 370/329 |
| 2008/0205348 A1 | 8/2008 | Malladi | |
| 2009/0046793 A1 | 2/2009 | Love et al. | |
| 2009/0103482 A1 | 4/2009 | Imamura et al. | |
| 2009/0109906 A1 | 4/2009 | Love et al. | |
| 2009/0196274 A1* | 8/2009 | Rimini et al. | 370/344 |
| 2009/0201863 A1* | 8/2009 | Pi | 370/329 |
| 2009/0207793 A1* | 8/2009 | Shen et al. | 370/329 |
| 2009/0207797 A1* | 8/2009 | Shen et al. | 370/329 |
| 2009/0209247 A1* | 8/2009 | Lee et al. | 455/422.1 |
| 2009/0310492 A1* | 12/2009 | Kazmi et al. | 370/241 |
| 2010/0208629 A1* | 8/2010 | Ahn et al. | 370/280 |
| 2010/0232378 A1* | 9/2010 | Imamura et al. | 370/329 |
| 2011/0051681 A1* | 3/2011 | Ahn et al. | 370/330 |
| 2011/0141941 A1* | 6/2011 | Lee et al. | 370/252 |
| 2011/0143796 A1* | 6/2011 | Lee et al. | 455/507 |
| 2011/0194524 A1* | 8/2011 | Hedlund et al. | 370/329 |
| 2011/0201333 A1* | 8/2011 | Kwon et al. | 455/434 |
| 2011/0299490 A1* | 12/2011 | Nordstrom et al. | 370/329 |
| 2012/0033588 A1* | 2/2012 | Chung et al. | 370/280 |
| 2012/0263134 A1* | 10/2012 | Malladi et al. | 370/329 |
| 2014/0105147 A1* | 4/2014 | Kim et al. | 370/329 |

FOREIGN PATENT DOCUMENTS

| | | |
|---|---|---|
| WO | 2007148710 A1 | 12/2007 |
| WO | 2008085000 A1 | 7/2008 |
| WO | 2008133454 A1 | 11/2008 |
| WO | 2008137864 A2 | 11/2008 |

OTHER PUBLICATIONS

NTT Docomo et al., "ACK/NACK Signal Structure in E-UTRA Downlink" (3GPP TSG RAN WG1 Meeting #48, R1-070867, Original R1-063326), Feb. 12-16, 2007, 4 pages, St. Louis USA.

Motorola, "MU_MIMO PHICH Assignment for Adaptive and non-Adaptive HARQ" (3GPP TSG RAN1 #50, R1-073409), Aug. 20-24, 2007, 4 pages, Athens Greece.

Motorola, "E-UTRA DL L1/L2 Control Channel Format for SIMO & MIMO" (3GPP TSG RAN WG1 #49bis, R1-072697), Jun. 25-29, 2007, 7 pages, Orlando USA.

Motorola et al., "Way Forward for DL Resource Allocation Mapping" (3GPP TSG RAN WG1 #49bis, R1-073227), Jun. 25-29, 2007, 4 pages, Orlando USA.

Motorola, "Downlink Resource Allocation Mapping for E-UTRA" (3GPP TSG RAN1 #50, R1-073372), Aug. 20-29, 2007, 5 pages, Athens Greece.

Ericsson, "Begin-End representation of scheduling allocations" (3GPP TSG RAN WG1 #49bis, R1-073052), Jun. 25-29, 2007, 2 pages, Orlando USA.

Samsung, "Resource Indication Scheme for Downlink Packet Scheduling" (3GPP TSG RAN WG1 #49bis, R1-073119), Jun. 25-29, 2007, 4 pages, Orlando USA.

Nokia and Nokia Siemens Networks, "Signalling and Decoding of PRB Allocations LTE Downlink" (3GPP TSG RAN WG1 #49bis, R1-072997), Jun. 25-29, 2007, 5 pages, Orlando USA.

NEC Group, "DL Unicast Resource Allocation Signalling Using L1L2 Control Channels" (3GPP TSG RAN WG1 #49bis, R1-072832), Jun. 25-29, 2007, 6 pages, Orlando USA.

Alcatel-Lucent, "Signaling Resource Allocations in DL Control Channel" (3GPP TSG RAN WG1 #49bis, R1-072923), Jun. 25-29, 2007, 10 pages, Orlando USA.

Qualcomm Europe, "Impact of Constrained Resource Signaling in PDCCH" (3GPP TSG RAN WG1 #49bis, R1-072750), Jun. 25-29, 2007, 9 pages, Orlando USA.

Nokia and Nokia Siemens Networks, "Additional Information on the Combinatorial PRB Allocation Signalling Method" (3GPP TSG RAN WG1 #49bis, R1-073217), Jun. 25-29, 2007, 4 pages, Orlando USA.

LG Electronics, "DL LVRB Assignment" (3GPP TSG RAN WG1 #49bis, R1-072877), Jun. 25-29, 2007, 4 pages, Orlando USA.

Mitsubishi Electronic, "Scheduling Policy and Signaling Way on DL Resource Allocation" (3GPP TSG RAN WG1 #49bis, R1-072723), Jun. 25-29, 2007, 6 pages, Orlando USA.

Patent Cooperation Treaty, "International Search Report and Written Opinion of the International Searching Authority" for International Application No. PCT/US2008/072750, Apr. 21, 2009, 12 pages.

United States Patent and Trademark Office, "Final Office Action Summary" for U.S. Appl. No. 12/178,754, Oct. 14, 2011, 31 pages.

3rd Generation Partnership Project, "Technical Specification Group Radio Access Network; Evolved Universal Terrestrial Radio Access (E-UTRA); Physical Layer Procedures (Release 8)," 3GPP TS 36.213 V8.5.0, Dec. 2008, pp. 1-74, Sophia Antipolis, France.

Jim Zyren and Dr. Wes McCoy, "Overview of the 3GPP Long Term Evolution Physical Layer", Jul. 2007, pp. 1-27, Freescale Semiconductor.

Hyung G. Myung, "Technical Overview of 3GPP LTE", May 18, 2008, pp. 1-53.

3rd Generation Partnership Project, "Technical Specification Group Radio Access Network; Evolved Universal Terrestrial Radio Access (E-UTRA); Physical Channels and Modulation (Release 8)," 3GPP TS 36.211 V8.5.0, Dec. 2008, pp. 1-82; Sophia Antipolis, France.

NEC, Nokia, and Nokia Siemens Network, "Way Forward on Control Channels Multiplexing", TSG-RAN-WG1 #50bis, R1-074505, Oct. 8-12, 2007, pp. 1-3, Shanghai, China.

Motorola, "PHICH Resource Signaling for TDD & FDD", 3GPP TSG RAN1 #52bis, R1-081286, Apr. 1-5, 2008, pp. 1-4, Shenzhen, China.

United States Patent and Trademark Office, "Non-Final Office Action" for U.S. Appl. No. 12/178,758, Sep. 2, 2010, 18 pages.

United States Patent and Trademark Office, "Non Final Rejection" for U.S. Appl. No. 12/178,754, Apr. 14, 2011, 15 pages.

Korean Intellectual Property Office, "Non-Final Rejection" for Korean Application No. 10-2010-7003226, Apr. 11, 2011, 7 pages.

United States Patent and Trademark Office, "Notice of Allowance and Fee(s) Due" for U.S. Appl. No. 12/178,754, Jul. 9, 2012, 9 pages.

Third Generation Partnership Project and Motorola, "Downlink Acknowledgment Channel", 3GPP TSG RAN #49 R1-072166, May 7-11, 2007.

Third Generation Partnership Project and Motorola, "ACK/NACK Indication for SIMO and MU-MIMO", 3GPP TSG RAN #48bis R1-071431, Mar. 26-30, 2007.

Third Generation Partnership Project et al. "ACK/NACK Signal Structure in E-UTRA Downlink", 3GPP TSG RAN WG1 #48bis R1-071656, Mar. 26-30, 2007.

Third Generation Partnership Project and Motorola, "PHICH Assignment for MU-MIMO in E-UTRA", 3GPP TSG RAN #50bis R1-074002, Oct. 8-12, 2007.

Chu Rui Chang et al., "PN Offset Planning Strategies for Non Uniform CDMA Networks," IEEE 47th Vehicular Tech. Conf., pp. 1543-1547, May 1997.

Third Generation Partnership Project and LG Electronics, "DL ACIQ NACK Mapping Relations", 3GPP TSG RAN WG1 #49bis R1-072882, Jun. 25-29, 2007.

Third Generation Partnership Project and Motorola, "E-UTRA DL L1/L2 Invariant Control Channel Mapping", 3GPP TSG RAN WG1 #48bis R1-071812, Mar. 26-30, 2007.

* cited by examiner

PHYSICAL LAYER ACKNOWLEDGEMENT SIGNALING RESOURCE ALLOCATION IN WIRELESS COMMUNICATION SYSTEMS

FIELD OF THE DISCLOSURE

The present disclosure relates generally to wireless communications and, more particularly, to allocating resources for physical layer acknowledgement signaling in wireless communication systems.

BACKGROUND OF THE DISCLOSURE

It is anticipated that some wireless communications protocols will support multiple uplink component carriers where a compliant user terminal, also referred to as user equipment (UE), will be able to transmit multiple subframes on multiple carriers. One such protocol is 3GPP LTE-Advanced (LTE-A). Existing physical layer acknowledgement schemes for LTE Release 8 can be used to acknowledge data signaling from only a single Release 8 compliant carrier per UE.

If the acknowledgement signaling for multiple uplink component carriers is handled by a single downlink carrier, the existing Physical Hybrid ARQ Indicator Channel (PHICH) resources specified in LTE Release 8 at 3GPP TS 36.211 Section 6.9 and 3GPP TS 36.213 Section 9.1.2 may be inadequate to acknowledge the uplink signaling on the additional component carriers.

The various aspects, features and advantages of the disclosure will become more fully apparent to those having ordinary skill in the art upon careful consideration of the following Drawings and accompanying Detailed Description.

DETAILED DESCRIPTION

A downlink subframe on a single downlink carrier supports physical layer acknowledgment signaling for multiple physical uplink shared channel (PUSCH) transmissions. These multiple PUSCH transmissions can be made by a remote unit across multiple component carriers in a single subframe, across multiple spatial channels in a single subframe, and/or across multiple subframes. The multiple PUSCH transmissions made by a remote unit include default PUSCH transmissions and additional PUSCH transmissions. The physical layer acknowledgement signaling may take the form of physical hybrid ARQ indicator channel (PHICH) signaling. A base unit reserves resource elements groups (REGs) for default PHICH signaling of default PUSCH transmissions. The base unit also reserves control channel elements (CCEs) for physical downlink control channel (PDCCH) signaling. A CCE contains multiple interleaved REGs. For example a CCE can contain nine REGS. The base unit reallocates one or more CCEs (formerly reserved for PDCCH per LTE Release 8) such that REGs corresponding to reallocated CCEs can be utilized for supporting additional PHICH signaling of additional PUSCH transmissions made by a remote unit.

The base unit implicitly or explicitly indicates to remote units that CCEs have been mapped for physical layer acknowledgement signaling of additional PUSCH transmissions. A remote unit receives the downlink subframe and derives the indices of the mapped CCEs using the implicit or explicit indication. Then, the remote unit determines physical layer acknowledgement signaling on the REGs reserved for physical layer acknowledgement signaling of the default uplink PUSCH transmissions and/or on the REGs corresponding to CCEs mapped for physical layer acknowledgement signaling of the additional PUSCH transmissions.

By mapping CCEs for physical layer acknowledgement signaling of additional PUSCH transmissions, the communication system can provide ACK/NACK signaling in support of multiple uplink carriers or multiple spatial channels or multiple uplink subframes or any other scenario where REGs reserved for default PHICH signaling are inadequate. Additionally, mapping CCEs for physical layer acknowledgement signaling of additional PUSCH transmissions does not disturb remote units that support only default PUSCH transmissions and do not support additional PUSCH transmissions.

Figure 1:
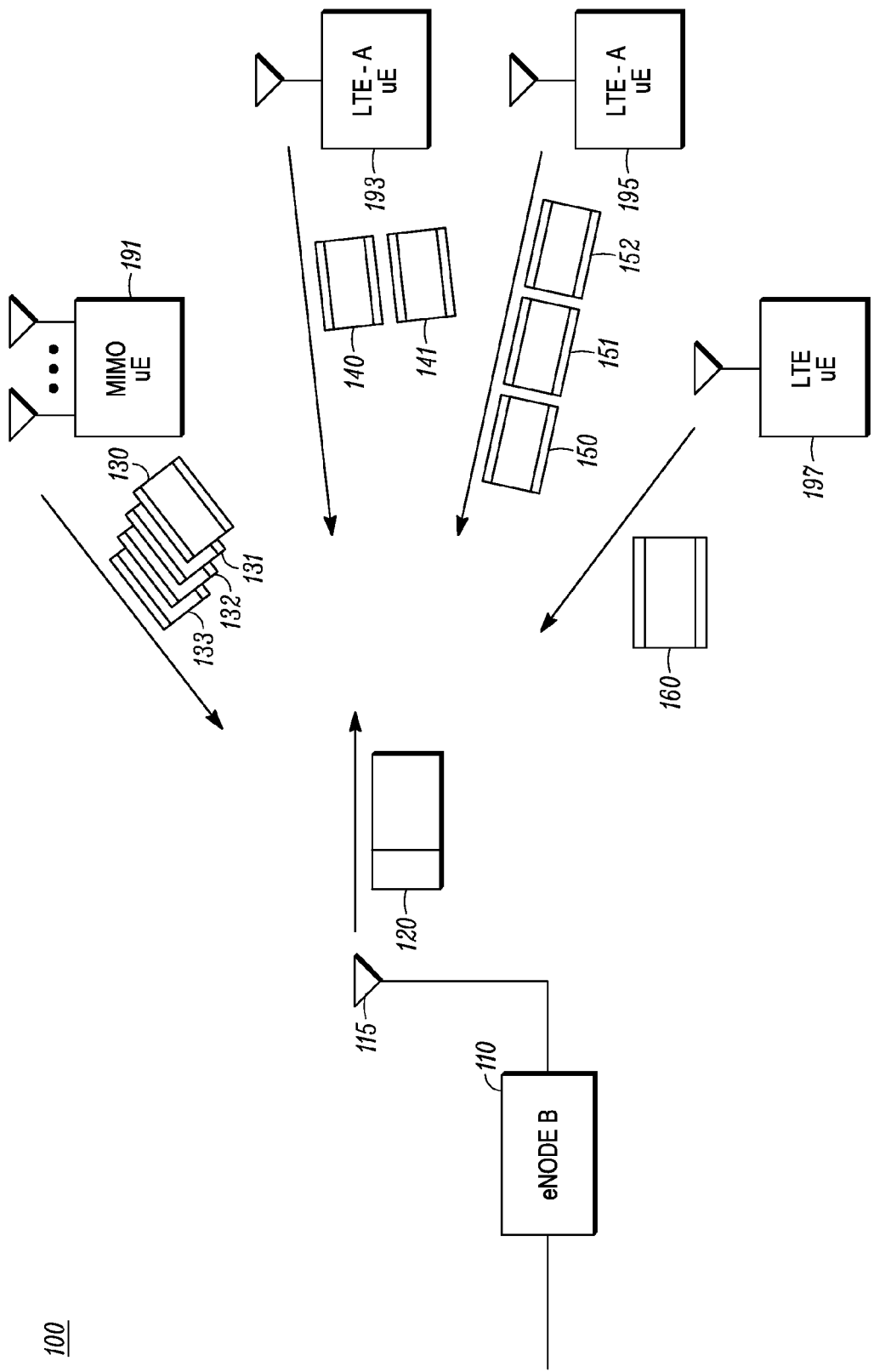
FIG. 1 illustrates a wireless communication system with a base unit that supports multiple physical uplink shared channel transmissions and multiple remote units.

FIG. 1 illustrates a wireless communication system 100 with a base unit 110 and multiple remote units 191, 193, 195, 197. The base unit 110 supports remote units that can make multiple PUSCH transmissions. The multiple PUSCH transmissions include default PUSCH transmissions and additional PUSCH transmissions. One of the remote units 191 supports additional PUSCH transmissions via uplink spatial multiplexing, another remote unit 193 supports additional PUSCH transmissions via carrier aggregation, and a third remote unit 195 supports additional PUSCH transmissions via multiple subframes. A fourth remote unit 197 does not support additional PUSCH transmissions and only supports default PUSCH transmissions. Although three remote units 191, 193, 195 are shown that support three different types of additional PUSCH transmissions, there may be other types of additional PUSCH transmissions, and the different types of additional PUSCH transmissions may be combined. For example, a remote unit (not shown) could support multiple PUSCH transmissions via both spatial multiplexing and carrier aggregation. Also, a single base unit need not support all types of multiple PUSCH transmissions.

A wireless communication system 100 is generally implemented with more than one base unit, and only one is shown for the sake of simplicity. A base unit may also be referred to as an access point (AP), an access terminal, a Node-B, an enhanced Node-B (eNodeB or eNB), or similar terminology. The base unit 110 is shown serving a number of remote units 191, 193, 195, 197 within a serving area (or cell) or within a sector of the base unit. The remote units may also be referred to as subscriber units, mobile units, mobile stations, user equipment (UE), user terminals, or by other terminology.

The base unit 110 communicates wirelessly with remote units 191, 193, 195, 197 to perform functions such as scheduling the remote units to receive or transmit data using available radio resources and acknowledging receipt of data from the remote units on their respective default or additional physical uplink shared channels. The wireless communication system 100 also includes management functionality including data routing, admission control, subscriber billing, terminal authentication, etc., which may be controlled by other network entities (not shown), as is known generally by those having ordinary skill in the art.

As shown, the base unit 110 transmits downlink (DL) communication signals to remote units 191, 193, 195, 197 on at least a portion of the same radio resources (time and/or frequency) of a DL carrier 120. The base unit may use one or more transmitters and one or more receivers that serve the remote units 191, 193, 195, 197. The number of transmitters at the base unit may be related, for example, to the number of transmit antennas 115 at the base unit 110. When multiple antennas are used to serve each sector to provide various advanced communication modes, for example, adaptive beam-forming, transmit diversity, transmit SDMA, and multiple stream transmission, etc., multiple base units can be deployed. These multiple base units within a sector may be highly integrated and may share various hardware and software components. For example, all base units co-located together to serve a cell can constitute what is traditionally known as a base station.

In LTE Release 8, ACK/NACK signaling for uplink transmissions is sent in a downlink subframe using a Physical Hybrid ARQ Indicator Channel (PHICH). An LTE Release 8 UE makes use of broadcast signaling on a physical broadcast channel (PBCH) to determine resource element (RE) locations where it should expect its default PHICH signaling. Depending on a PHICH resource factor Ng, a PHICH duration value, whether the cyclic prefix is normal or extended, and system bandwidth, the LTE Release 8 UE can receive ACK/NACK signaling for its PUSCH transmissions on a single uplink component carrier or a single uplink spatial channel. The amount of PHICH resources reserved by the network is configurable via the PHICH resource factor Ng, which may be Ng=⅙, ½, 1, or 2. Resource factor Ng=1 approximates the case of one ACK/NACK resource per uplink physical resource block (PRB) assuming the number of downlink PRBs equals the number of uplink PRBs, which is a typical deployment scenario for LTE Release 8. Ng=2 over-dimensions the ACK/NACK resources to account for UL virtual MIMO support where a single PRB can be used by two different UEs. Ng=½ and Ng=⅙ provision fewer ACK/NACK resources than available uplink PRBs.

Because remote unit 191 is equipped with a multiple-input, multiple-output (MIMO) spatial-diversity antenna and multiple transceivers, it supports communication with its serving base unit 110 on multiple spatial channels 130, 131, 132, 133 via uplink spatial multiplexing. In this situation, one DL radio carrier 120 can provide control signaling for more than one UL spatial channels, and one DL radio subframe on the DL carrier 120 should be able to acknowledge communication signals from multiple uplink spatial channels. If four spatial channels are assigned, the number of Resource Elements (REs) required for PHICH allocation may need to be quadrupled relative to LTE Release 8 which supports only one uplink spatial channel per UE. Although four spatially-multiplexed subframes are shown, the number of spatially-multiplexed subframes can be greater or fewer depending on the remote unit and its utilization.

Another remote unit 193 supports multiple PUSCH transmissions using multiple component carriers 140, 141. Control signaling for these multiple component carriers is handled by a single downlink carrier 120 (anchor carrier). In such a situation, the anchor carrier 120 may have to support acknowledgement signaling for the multiple uplink components carriers 140, 141. If two uplink component carriers are assigned, the number of REs required for PHICH allocation may need to be doubled relative to LTE Release 8. Although two carrier aggregated component carriers are shown, the number of component carriers can be greater or fewer depending on the remote unit's implementation and utilization.

A third remote unit 195 supports multiple PUSCH transmissions using multiple subframes 150, 151, 152. Control signaling for these transmissions on multiple subframes is handled by a single subframe in downlink carrier 120. In such a situation, the single downlink carrier 120 may have to simultaneously support acknowledgement signaling for the multiple physical uplink shared channels 150, 151, 152 transmitted on multiple subframes. If three uplink subframes are assigned, the number of REs required for PHICH allocation may need to be tripled relative to LTE Release 8. Although three PUSCH subframes are shown, the number of multiple subframes can be greater or fewer depending on the remote unit's implementation and utilization.

A fourth remote unit 197 does not support PUSCH transmissions across multiple uplink component carriers or multiple uplink spatial channels. In this situation, a subframe of a DL radio carrier 120 only controls a single uplink carrier 160 and only needs to support PHICH for that single UL carrier 160.

The maximum value of Ng in LTE Release 8 has been dimensioned to support default PUSCH transmissions made by legacy remote units (such as remote unit 197 in FIG. 1) on a single uplink component carrier or on a single uplink spatial channel. However, additional PUSCH transmissions can be made by advanced remote units (such as remote units 191, 193, 195) across multiple component carriers in a single subframe, or across multiple spatial channels in a single subframe, and/or across multiple subframes. Default PHICH resources provisioned by LTE Release 8 provisioning mechanisms may not be adequate to support additional PHICH signaling for additional PUSCH transmissions made by advanced remote units.

Although three specific situations that may require additional PHICH resources are shown (per remote units 191, 193, 195), there may be other situations where additional PHICH resources are needed. For example, in any situation where the existing PHICH provisioning mechanisms in LTE Release 8 are inadequate, additional PHICH resources may be required. In all of these situations, control channel elements (CCEs) within a control portion of a DL subframe are reallocated to signal PHICH.

Figure 2:
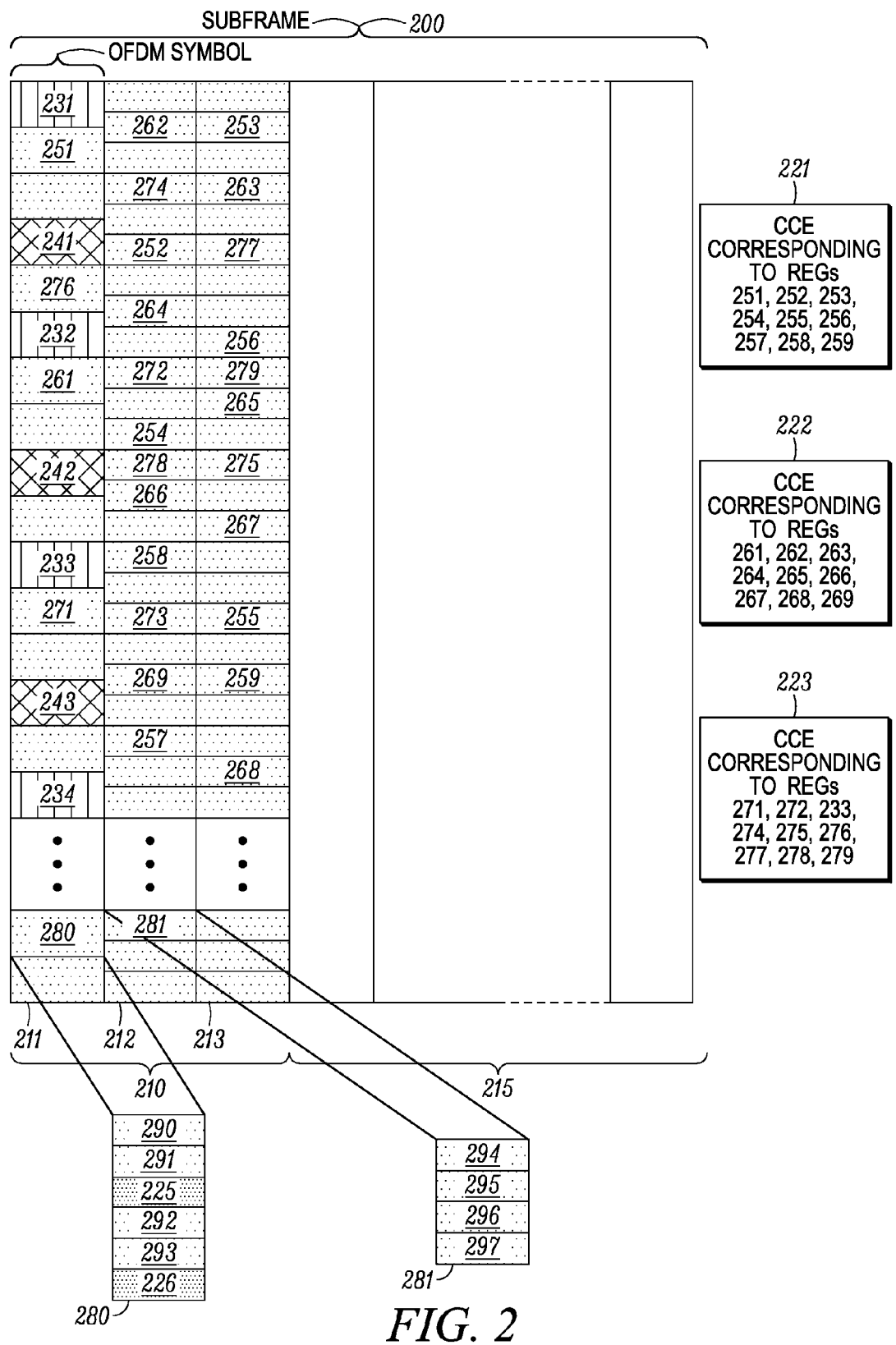
FIG. 2 illustrates a downlink radio subframe with various resources allocated for physical layer acknowledgement signaling.

FIG. 2 illustrates a downlink radio subframe 200 with resources allocated for physical layer acknowledgement signaling. This downlink subframe 200 constitutes a portion of a radio frame (not shown). A radio frame generally has a concatenated continuum of subframes. In FIG. 2, the subframe 200 includes a control region 210 and a data region 215. This subframe 200 shows three Orthogonal Frequency Division Multiplex (OFDM) symbols 211, 212, 213 in the control region 210. Other subframes may have one, two, or three symbols in their control regions.

Resource elements in the control region 210 are used to signal control information to the remote units in a system (such as system 100 shown in FIG. 1). In the control region 210, resource element groups (REGs) are used for mapping control channels to resource elements. A REG may have REs that are mapped to only control channels or REs that are mapped to both control channels and reference signals. In FIG. 2, REGs in the first OFDM symbol 211 contains REs that are mapped to both control channels and reference signals. REGs in the second OFDM symbol 212 and the third OFDM symbol 213 are mapped to only control channels. For example, REG 280 in the first OFDM symbol 211 has six REs where, REs 290, 291, 292, 293 are mapped to a control channel and REs 225 and 226 are mapped to reference signals. REG 281 in the second OFDM symbol 212 has four REs where REs 294, 295, 296, 297 are mapped to a control channel and no REs are mapped to other signals.

One or more REGs 231, 232, 233, 234 are reserved for Physical Control Format Indicator Channel (PCFICH) signaling. The PCFICH carries information about the number of OFDM symbols used for transmission of a Physical Downlink Control Channel (PDCCH) in a subframe. The PCFICH is transmitted when the number of OFDM symbols for the PDCCH is greater than zero.

Further REGs 241, 242, 243 are reserved for default PHICH of default PUSCH transmissions. PHICH signaling on REGs 241, 242, 243 can be utilized to support ACK/NACK for default PUSCH transmissions by both legacy (LTE) remote units 197 and advanced (LTE-A) remote units 191, 193, 195. The default PUSCH transmissions can be made by the remote units on a default uplink carrier is a carrier that is accessible to legacy remote units (e.g. remote unit 197 shown in FIG. 1) plus is accessible to advanced remote units that support spatial multiplexing (e.g., remote unit 191 shown in FIG. 1), carrier aggregation (e.g. remote unit 193 shown in FIG. 1), and/or multiple subframes (e.g., remote unit 195 shown in FIG. 1).

The PHICH carries the hybrid-ARQ ACK/NAK for uplink physical resource blocks signaled using the one or more assigned physical uplink shared channels. Multiple PHICHs mapped to the same set of resource elements constitute a PHICH group, where PHICHs within the same PHICH group are separated through different orthogonal sequences. A single PHICH group can require a plurality of REGs. For example, a PHICH group is commonly assigned three REGs.

A physical downlink control channel (PDCCH) carries scheduling assignments and other control information. A physical downlink control channel is transmitted on an aggregation of one or several consecutive control channel elements (CCEs), where a CCE corresponds to multiple interleaved REGs. In the subframe 200 shown, interleaved REGs 251, 252, 253, 254, 255, 256, 257, 258, 259 correspond to a first CCE 221 that is reserved for PDCCH signaling. REGs within a CCE can be mapped in non-contiguous time and frequency locations within the control region 210 for increased time and frequency diversity. Such mapping can be achieved by applying a mapping function. Further, the mapping function could be conditioned on an interleaver that permutes the REGs corresponding to the CCE. The interleaver can be a subblock interleaver that is defined in 3GPP TS 36.212 section 5.1.4.1.1.

If needed for additional hybrid-ARQ ACK/NAK signaling, one or more CCEs are mapped such that the REGs corresponding to the reallocated CCE can be utilized for additional PHICH signaling. In FIG. 2, CCE 222 corresponding to interleaved REGs 261, 262, 263, 264, 265, 266, 267, 268, 269 is reallocated to support additional PHICH signaling. As mentioned previously, a PHICH group can require three REGs. Therefore, a group of nine REGs that is mapped for additional PHICH signaling can support for example three additional PHICH groups. In CCE 222, which is mapped for additional PHICH signaling, REGs {261,264, 267} can be used to signal one additional PHICH group, REGs {262,265,268} can be used to signal another additional PHICH group, and REGs {263,266,269} can be used to signal a third additional PHICH group.

More generally, combinations of REGs from one or more reallocated CCEs may be used to indicate an additional PHICH group and provide good frequency diversity for PHICH signaling. Also, REGs from different CCEs that make a PDCCH (e.g., LTE Release 8 PDCCH format 1, 2, 3 with 2, 4, 8 CCE aggregation) may also be combined to indicate additional PHICH groups. Note that, although an entire CCE is reallocated, not all REGs in a reallocated CCE will need to be utilized for additional PHICH signaling.

To maintain a diverse assignment of REGs (from reallocated CCEs) across frequency for PHICH signaling, a mapping function may be applied to assign REGs to appropriate PHICH groups. Such a mapping function could be conditioned on an interleaver that permutes the CCE REGs across frequency and time. The interleaver can be a subblock interleaver that is defined in 3GPP TS 36.212 section 5.1.4.1.1.

CCEs that are mapped to support additional PHICH signaling for additional PUSCH transmissions in a given subframe can be reverted back to supporting PDCCH signals in other subframes that do not require additional PHICH signaling. FIG. 2 illustrates a CCE 223 corresponding to interleaved REGs 271, 272, 273, 274, 275, 276, 277, 278, 279 that were mapped for additional PHICH signaling in a previous subframe (not shown), and has been reverted back to PDCCH use in the current subframe 200.

Legacy remote units that do not support additional PUSCH transmissions (such as remote unit 197 shown in FIG. 1) will be unaware of the reallocated CCE 222. If the remote unit monitors a reallocated CCE 222 while searching for its PDCCH, signaling on the reallocated CCE 222 will not correspond to a valid PDCCH signal (because it is being used by the network to signal additional PHICH instead). The legacy remote unit will then simply skip the reallocated CCE 222 and monitor other CCEs in search of its PDCCH signals. The default PHICH reception mechanism on REGs 241,242,243 corresponding to default PUSCH transmissions remains unchanged, so the PHICH reception of remote units that do not support additional PUSCH transmissions will be unaffected.

For remote units that support additional PUSCH transmissions (such as remote units 191, 193, 195 shown in FIG. 1), PHICH signaling for the default PUSCH transmissions (e.g., the PUSCH transmissions on an uplink carrier that has a default pairing with an anchor carrier in a carrier aggregation situation) will remain unchanged. The REGs 241, 242, 243 reserved for default PHICH are determined using a conventional method (e.g., the method described in 3GPP TS 36.213 section 9.1.2). Additional PHICH resources for resource blocks corresponding to additional PUSCH transmissions will be indexed using an additional mechanism described later in detail.

Using an example from FIG. 1 and FIG. 2, assuming a PHICH resource factor Ng=1 and a normal cyclic prefix, if one 1.4 MHz paired anchor carrier 120, 140 is supporting signaling for one additional component carrier 141, then PHICH signaling is needed for two uplink carriers (i.e., one default carrier 140 and one additional carrier 141). ACK/NACK transmissions for the default carrier 140 are assigned $N_1$ default PHICH groups (e.g., one PHICH group mapped to three REGs 241, 242, 243 as shown in FIG. 2). ACK/NACK transmissions for the additional carrier 141 are assigned to $N_2$ additional PHICH groups (e.g., one PHICH group mapped to REGs 261, 264, 267 of CCE 222). The number of PHICH groups required to support each component carrier may be different; additional PUSCH transmissions and additional PHICH dimensioning may not necessarily have to correspond to the same Ng value, cyclic prefix value, and system bandwidth as the default PUSCH transmissions and default PHICH dimensioning. Thus, additional PHICH groups are created by mapping CCE 222.

A base unit that supports additional PUSCH transmissions (such as base unit 110 shown in FIG. 1) informs remote units that support additional PUSCH transmissions (such as remote units 191, 193, 195) via dedicated Radio Resource Control (RRC) signaling, broadcast RRC signaling, or an implicit indication, that CCEs have been reallocated. CCEs can be reallocated on a dynamic basis (e.g., every subframe or every radio frame) or on a semi-static basis (e.g., between two reconfiguration messages). The set of CCEs that are reallocated may change or hop (e.g., on a subframe basis or on a radio frame basis) for interference randomization or so as to avoid blocking a PDCCH signaled on a particular set of aggregated CCEs.

Figure 3:
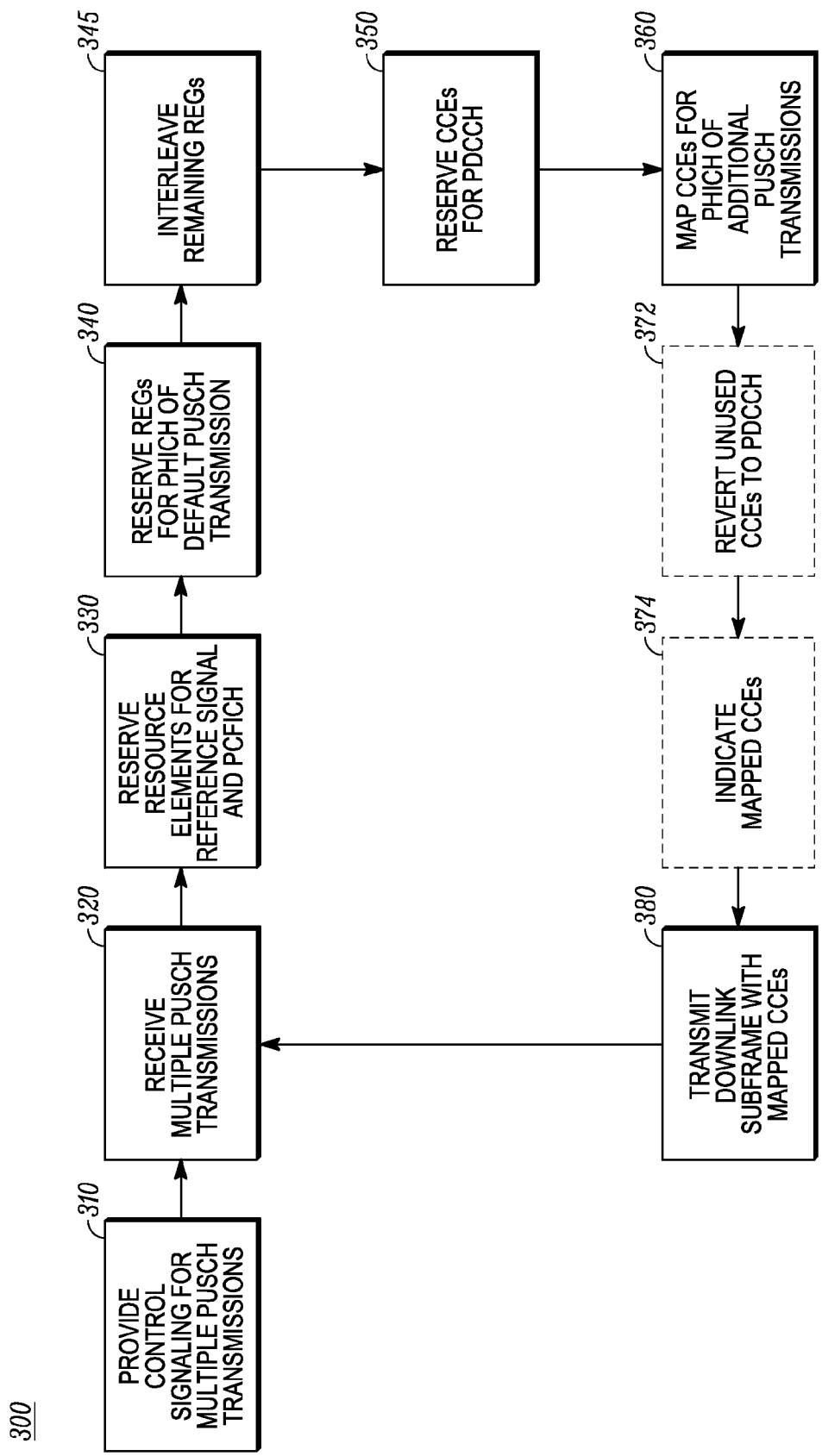
FIG. 3 illustrates a flow diagram for a base unit allocating resources for physical layer acknowledgement signaling.

FIG. 3 illustrates a flow diagram 300 for a base unit allocating resources for physical layer acknowledgement signaling. A base unit (such as base unit 110 shown in FIG. 1) that supports multiple PUSCH transmissions, provides 310 control signaling to a remote unit that supports multiple PUSCH transmissions (such as remote unit 191, 193, 195 shown in FIG. 1). The multiple PUSCH transmissions include default PUSCH transmissions and additional PUSCH transmissions. The control signaling assigns multiple physical uplink shared channels to that remote unit. The configuration may be valid for one or more uplink subframes. Assignment of multiple PUSCH transmissions uses a downlink message and can be semi static (e.g., an RRC message directing the remote unit to use N uplink component carriers until further reconfiguration) or dynamic (e.g., an uplink grant directing the remote unit to use multiple uplink component carriers in a particular uplink subframe).

The base unit then receives 320 multiple uplink subframes on the assigned multiple physical uplink shared channels (or a subset of the assigned multiple physical uplink shared channels) and determines whether the data signals in the received subframes necessitate an ACK or a NACK response. When composing the downlink subframe that will include the acknowledgement signaling for the multiple PUSCH transmissions, the base unit reserves 330 resource elements (e.g., REs 225, 226 shown in FIG. 2) for reference signal transmission and PCFICH (e.g. REs within REGs 231, 232, 233, 234 shown in FIG. 2). The base unit also reserves 340 resource element groups (e.g., REGs 241, 242, 243) for default PHICH of default PUSCH transmissions (e.g., PUSCH transmissions on an uplink carrier that has a default pairing with an anchor carrier of a remote unit that supports carrier aggregation, or PUSCH transmissions made by UE in a non spatial multiplexing mode). REGs reserved for default PHICH can vary between downlink subframes based on the value of PCFICH, Ng and PHICH duration.

Remaining REGs are interleaved 345 and grouped into CCEs (e.g., CCEs 221, 222, 223 shown in FIG. 2) with each CCE corresponding to multiple REGs (e.g., nine REGs). Some of these CCEs are reserved 350 for PDCCH and other CCEs are mapped 360 for additional PHICH signaling for the additional PUSCH transmissions.

The reserving 350 CCEs step and the mapping 360 CCEs step may be performed in any order (including concurrently) by the base unit. Additional PHICH signaling can be sent using PHICH groups. Considering the example of LTE Release 8, each PHICH group requires three REGs. A CCE corresponds to nine REGs. Therefore, a single CCE mapped for use as additional PHICH signaling can support three additional PHICH groups.

For example, a first additional component carrier with a PHICH resource factor Ng=2, normal cyclic prefix, and system bandwidth of 1.4 MHz would require two additional PHICH groups and a second additional component carrier with a PHICH resource factor Ng=1, normal cyclic prefix, and system bandwidth of 1.4 MHz would require one additional PHICH group. Mapping one CCE for use as additional PHICH signaling would support the ACK/NACK signaling for physical resource blocks received by the base unit on both the first additional component carrier and the second additional component carrier.

In downlink subframes where additional PHICH signaling is not required, the reallocated CCEs can be reverted 372 back to PDCCH use (e.g., CCE 223 in FIG. 2). Reverting CCE resources that support additional PHICH signaling back for PDCCH control signaling provides more opportunities for PDCCH signaling and reduces occasions where PDCCH signaling is blocked to accommodate additional PHICH signaling.

The base unit may implicitly or explicitly indicate 374 the set of CCEs that have been mapped to carry additional PHICH resources. Implicit indication is merely the fact that the control signaling provided 310 previously supports additional PUSCH transmissions. In this situation, the quantity of additional uplink physical uplink shared channels is known, and a remote unit can calculate the set of mapped CCEs from known parameters such as the component carrier bandwidth. A simple conversion uses the uplink bandwidth to specify the quantity of reallocated CCEs. Another conversion uses the quantity of reallocated CCEs to determine the indices of the mapped CCEs. After the indices of the mapped CCEs are known by the remote unit, the remote unit can receive PHICH signaling on the REGs reserved for default PHICH signaling and also on the REGs of the mapped CCEs. In an other embodiment, the set of mapped CCEs may also be implicitly indicated by the base unit using the identity of the component carrier on which the remote units are configured to transmit, or the cell ID of the base unit, or subframe number on which PUSCH transmissions are made, and other variables.

An example of explicitly indicating 374 the CCEs that have been mapped involves the base unit broadcasting the quantity of CCEs reallocated on a cell-specific basis. In other words, a "quantity of CCEs mapped" value is broadcast for each additional set of physical uplink shared channel transmissions (e.g., PUSCH transmissions on each additional component carrier or PUSCH transmissions on each additional spatial channel). Alternately, a scaling parameter can be broadcast on a cell-specific basis, and the remote unit can use the scaling parameter to scale a predefined value to determine the quantity of CCEs mapped. After the quantity of CCEs mapped has been determined (directly from a broadcast or indirectly using a broadcasted scaling parameter), the remote unit derives the indices of the mapped CCEs for each additional physical uplink shared channel. For example, a conversion function can be used to determine that the three CCEs with the highest index numbers have been mapped for supporting additional PHICH for the first additional component carrier and the two CCEs with the next highest index numbers have been mapped for supporting additional PHICH for the second additional component carrier.

Alternately, the indices of the mapped CCEs can be broadcast instead of (or in addition to) broadcasting the quantity of CCEs mapped. If the indices of the mapped CCEs are broadcast on a cell-specific basis, then the UE has direct signaling regarding the CCEs that have been mapped.

Instead of broadcast signaling, the base unit can transmit remote unit-specific RRC signals indicating the quantity of mapped CCEs, the indices of mapped CCEs, or both the quantity and indices of mapped CCEs. The broadcast or remote unit-specific signaling can be implemented at the radio resource control layer. Explicit indication 374 of CCE indices is useful in scenarios where reallocated CCE indices have to be updated by the base unit frequently for purposes of interference randomization, to avoid blocking a PDCCH of a particular aggregation level, and other reasons Next, the base unit transmits 380 a downlink subframe with reference signals, PCFICH, default PHICH, PDCCH, and CCEs mapped to additional PHICH. As further multiple uplink PUSCH transmissions are received 320, the process repeats to provide hybrid ARQ acknowledgement of physical layer data signaling with multiple PUSCH transmissions. At different times, the base unit may transmit a downlink subframe that includes reallocated CCEs and a downlink subframe that does not include reallocated CCEs.

In another embodiment implicit indication is based on the lowest indexed CCE (n_lindex) of the PDCCH used to transport a PUSCH scheduling message to point to the corresponding assigned PHICH group or PHICH. In a further embodiment, n_lindex is used to compute k1=n_lindex mod 2 where k1 may act as an offset into one set of PHICH resources or acts as a pointer to distinguish between a first and a second set of PHICH resources. In the latter case it may also act as a pointer to the appropriate PHICH resources in the second set of PHICH resources.

In another approach, when carrier aggregation is used to support multiple uplink component carriers, additional PHICH resources may be obtained by using two physical resource blocks (PRBs) at either end of the data region (e.g., data region 215 shown in FIG. 2) of a downlink subframe. The physical resource blocks can span the entire subframe or span only a slot within the subframe. If the system bandwidth was 20 MHz, using these two resource blocks from each end of the band would allow for diverse allocation and provide a significant number of PHICH resources. For example, there are 240 Resource Elements (REs) per PRB. Four REs are needed to create a REG, so 60 REGs are available from one PRB. A PHICH group requires 3 REGs, so 20 PHICH groups can be signaled using one PRB. Finally, depending on whether a long or short cyclical prefix is used for each PHICH, the 20 PHICH groups can indicate either 80 or 160 ACK/NACKs. An explicit or implicit indication may also used to indicate to a remote unit when it should use PHICHs based on PRB resources and to indicate which PRBs have been reserved for supporting PHICHs and how to index to the appropriate PHICH in a particular PHICH group that is based on PRB resources.

Figure 4:
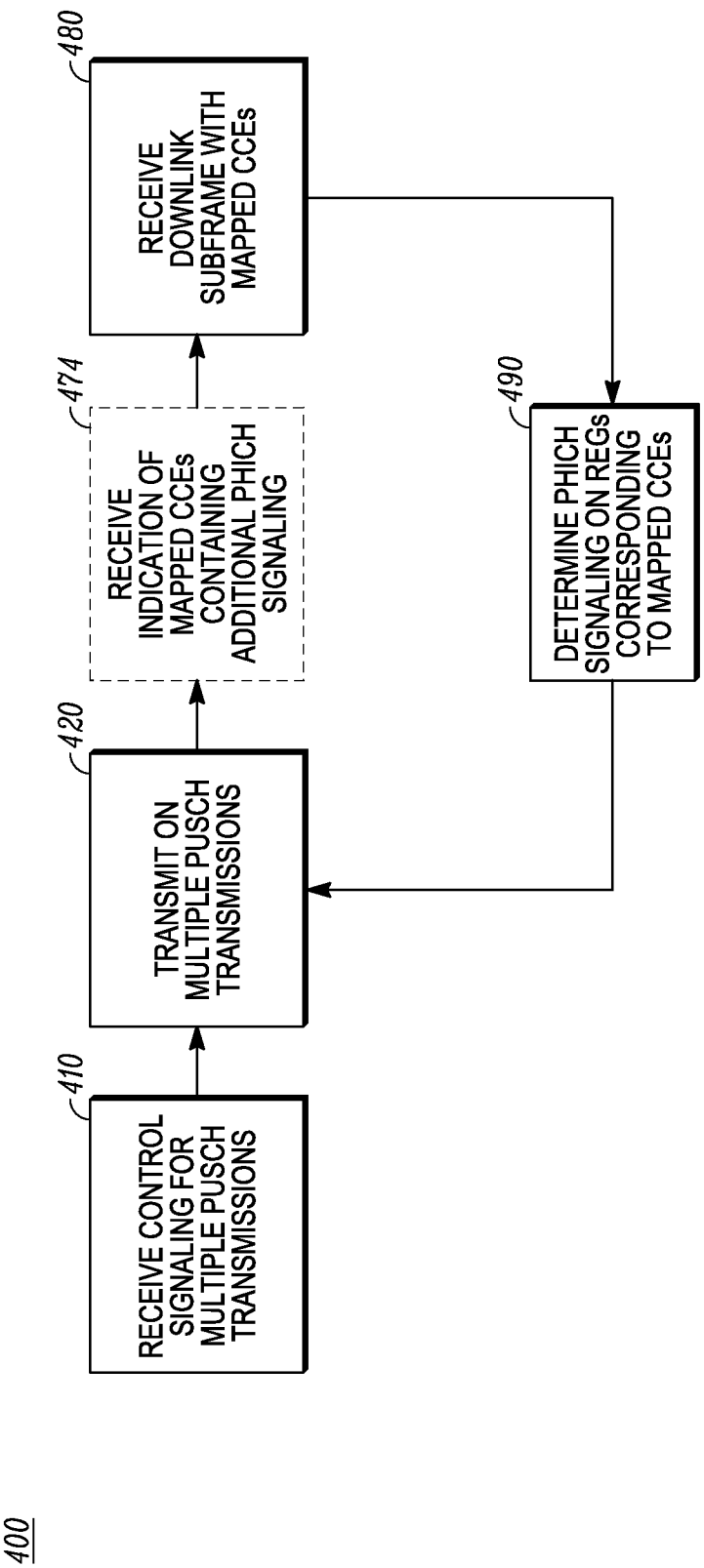
FIG. 4 illustrates a flow diagram for a remote unit to access additional physical layer acknowledgement signaling resources that have been allocated by a base unit.

FIG. 4 illustrates a flow diagram 400 for a remote unit to access additional PHICH resources that have been allocated by a base unit. If a remote unit (such as remote units 191, 193, 195 shown in FIG. 1) that supports multiple PUSCH transmissions (multiple PUSCH transmissions can include default PUSCH transmissions and additional PUSCH transmissions) receives 410 control signaling from a serving base unit that assigns multiple physical uplink shared channels to that remote unit, then the remote unit will transmit 420 resource blocks on one or more of its assigned multiple physical uplink shared channels.

The remote unit may optionally receive 474 radio resource control signaling indicating whether CCEs were mapped to be additional PHICH resources. If the base unit uses RRC signaling to indicate the total quantity of mapped CCEs (either by transmitting this information directly or indirectly using a scaling factor or using another method), the remote unit calculates the set of mapped CCEs using a predefined conversion function. If the base station uses RRC signaling to indicate the indices of mapped CCEs, the remote unit uses this information directly. If the remote unit receives both the quantity of mapped CCEs and the indices of the mapped CCEs over RRC signaling, the remote unit can verify one received data point using the other received data point.

The remote unit may never explicitly receive 474 such an indication of mapped CCEs or it may receive an indication every subframe, every radio frame, or when a RRC configuration message with mapping information is received.

The remote unit receives 480 a downlink subframe with reallocated CCEs and determines 490 additional PHICH signaling for its additional PUSCH transmissions on REGs that correspond to CCEs that were mapped for use as additional PHICH resources. The remote unit can also optionally determine its default PHICH signaling for its default PUSCH transmissions on a separate set of REGs 340 reserved by the base unit.

As further multiple uplink subframes are transmitted 420, the method repeats to access acknowledgement of physical layer data signaling in multiple PUSCH transmission situations. The remote unit may receive some downlink subframes that include reallocated CCEs and some downlink subframes that do not include reallocated CCEs.

In one embodiment, a remote unit that supports additional PUSCH transmissions (e.g., remote unit 191, 193, 195 shown in FIG. 1) can receive a first downlink subframe and determine its default PHICH signaling on a first set of default REGs in the first subframe and determine its additional PHICH signaling on a first CCE (e.g., REGs corresponding to the first CCE) in the first subframe. The remote unit can then receive a second downlink subframe and determine its default PHICH signaling on a second set of default REGs in the second subframe and determine its PDCCH signaling on a second CCE (e.g., REGs corresponding to the second CCE) in the second subframe wherein the first and second CCEs have the same CCE index.

If a remote unit that does not support additional PUSCH transmissions (e.g., remote unit 197 shown in FIG. 1) receives a downlink subframe with reallocated CCEs, the CCEs will be presumed to be used for PDCCH signaling. But because the PHICH signaling in the reallocated CCEs will not form a valid PDCCH signal for the remote unit 197, the remote unit 197 will simply monitor other CCEs in search of its own PDCCH. In other words, a remote unit 197 that does not support additional PUSCH transmissions will be unaware that CCEs have been mapped for use as PHICH resources.

By reallocating CCEs from use as PDCCH signaling to additional PHICH signaling, a base unit can provide additional ACK/NACKs signaling for uplink transmissions whenever the REGs reserved for default PHICH signaling are inadequate to support additional PHICH signaling. Because LTE-A is expected to support multiple uplink component carriers, it is expected that mapping CCEs for use as PHICH resources will allow a single downlink carrier to acknowledge signaling from multiple uplink component carriers.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method in a wireless communication network infrastructure entity comprising:
    receiving transmissions on a first physical uplink shared channel from a first component carrier;
    receiving transmissions on a second physical uplink shared channel from a second component carrier;
    transmitting a first downlink subframe with a first control channel element, mapped for physical downlink control channel signaling, and with at least one resource element group, which contains multiple resource elements, mapped for physical layer acknowledgement signaling of the second physical uplink shared channel; and
    transmitting a second downlink subframe with a second control channel element, mapped for physical layer acknowledgement signaling of the first physical uplink shared channel,
    wherein a first control channel element index number of the first control channel element is equal to a second control channel element index number of the second control channel element.

2. A method according to claim 1 wherein the receiving transmissions on the first physical uplink shared channel comprises receiving transmissions from a first spatial channel; and wherein the receiving transmissions on the second physical uplink shared channel comprises receiving transmissions from a second spatial channel.

3. A method according to claim 1 wherein the receiving transmissions on the first physical uplink shared channel comprises receiving transmissions from a first subframe; and wherein the receiving transmissions on the second physical uplink shared channel comprises receiving transmissions from a second subframe.

4. A method according to claim 1 further comprising:
    reserving resource elements for reference signaling.

5. A method according to claim 1 further comprising:
    reverting transmitting a third downlink subframe with a third control channel element mapped for to physical downlink control channel signaling,
    wherein a third control channel element index number of the third control channel element matches the second control channel element index number.

6. A method according to claim 1 further comprising:
    transmitting an indication of the second control channel element.

7. A method according to claim 6 further wherein indicating comprises:
    transmitting a quantity of control channel elements mapped for physical layer acknowledgement signaling on a radio resource control signal.

8. A method according to claim 6 further wherein indicating comprises:
    transmitting the second control channel element index number on a radio resource control signal.

9. A method according to claim 1, wherein the second control channel element contains nine resource element groups and wherein at least one resource element group contains at least four resource elements.

10. A method according to claim 9 further comprising:
    receiving a third downlink subframe with a third control channel element mapped for physical downlink control channel signaling;
    wherein the third downlink subframe is received prior to the receiving the first downlink subframe, and a third control channel element index number of the third control channel element matches the first control channel element index number.

11. A method in a wireless communication device comprising:
    transmitting on a first physical uplink shared channel on a first component carrier;
    transmitting on a second physical uplink shared channel on a second component carrier;
    receiving a first downlink subframe with a first control channel element, mapped for physical downlink control channel signaling, and with at least one resource element group, mapped for physical layer acknowledgement signaling, of the second physical uplink shared channel;
    determining physical layer acknowledgement signaling for the second physical uplink shared channel in the first control channel element; and
    receiving a second downlink subframe with a second control channel element, mapped for physical downlink control channel signaling of the first physical uplink shared channel,
    wherein a first control channel element index number of the first control channel element matches a second control channel element index number of the second control channel element.

12. A method according to claim 11 further comprising:
   determining physical layer acknowledgement signaling for the first physical uplink shared channel in the resource element group.

13. A method according to claim 11 comprising:
   receiving an indication that the first control channel element has been mapped for physical layer acknowledgement signaling.

14. A method according to claim 13 wherein the receiving an indication comprises:
   receiving control channel signaling for more than one physical uplink shared channel.

15. A method according to claim 13 wherein the receiving an indication comprises:
   determining a quantity of physical uplink shared channels from control channel signaling; and
   deriving the first control channel element index number from the quantity of physical uplink shared channels.

16. A method according to claim 13 wherein the receiving an indication comprises:
   receiving a quantity of control channel elements mapped for physical layer acknowledgement signaling on a radio resource control signal.

17. A method according to claim 13 wherein the receiving an indication comprises:
   receiving the first control channel element index number on a radio resource control signal.

* * * * *